United States Patent [19]

Isono et al.

[11] 4,101,927
[45] Jul. 18, 1978

[54] VIR CONTROL APPARATUS FOR COLOR TELEVISION RECEIVER

[75] Inventors: Katsuo Isono, Kawagoe; Seiji Sanada, Yokosuka, both of Japan

[73] Assignee: Sony Corporation, Tokyo, Japan

[21] Appl. No.: 753,869

[22] Filed: Dec. 23, 1976

[30] Foreign Application Priority Data

Dec. 27, 1975 [JP] Japan .................................. 50-156974

[51] Int. Cl.² .......................... H04N 9/535; H04N 5/14
[52] U.S. Cl. ........................................ 358/27; 358/28; 358/168; 358/169
[58] Field of Search ..................... 358/10, 27, 28, 168, 358/169, 21, 139

[56] References Cited

U.S. PATENT DOCUMENTS

| 3,673,320 | 6/1972 | Carnt et al. ............................ 358/19 |
| 3,679,816 | 7/1972 | Avins et al. ............................ 358/28 |
| 3,950,780 | 4/1976 | Freestone ................................ 358/28 |

OTHER PUBLICATIONS

GE's "Broadcast-Controlled" Color System–Part 2, Electronic Technician/Dealer, Sep. 1976, pp. 20-29.
Kenfield, "VIR Color Correction from Camera to Pix," Radio–Electronics, vol. 47, No. 11, pp. 83-85, Nov. 1976.
GAP/R Electronic Analog Computers, Philbrick Researchers, Inc., Model K2-W Operational Amplifier, rec'd 1958.

*Primary Examiner*—John C. Martin
*Attorney, Agent, or Firm*—Lewis H. Eslinger; Alvin Sinderbrand

[57] ABSTRACT

Color television receiving apparatus is provided for receiving a composite television signal which includes horizontal synchronizing signals, color burst signals and luminance and chrominance components. The composite color television signal is of the type which additionally may include a VIR signal which is provided in a predetermined line interval during the vertical retrace interval. The receiving apparatus comprises signal processing circuitry for processing the received composite color television signal so as to produce a video picture therefrom. A sampling signal generator generates sampling signals during the predetermined line intervals in which the VIR signal is provided. A VIR detector is coupled to the signal processing circuitry and is responsive to the sampling signals to detect if the VIR signal is included in the received composite color television signal. At least one component produced by the signal processing circuitry is sampled by the sampling signals to produce sampled control signals. A manually adjustable generator produces manually adjustable control signals; and switching circuitry coupled to the sampling circuitry and to the manually adjustable generator is controlled by the VIR detector to selectively supply either the sampled control signals or the manually adjustable control signals to control circuitry which, in turn, controls the signal processing circuitry so as to control predetermined characteristics of the reproduced video picture. These controlled characteristics may be the luminance levels or color characteristics, such as hue and saturation, or both luminance levels and color characteristics. An improved type of sampling circuit which can be used with this color television receiving apparatus also is disclosed.

21 Claims, 13 Drawing Figures

VIR CONTROL APPARATUS FOR COLOR TELEVISION RECEIVER

BACKGROUND OF THE INVENTION

This invention relates to color television receiving apparatus and, more particularly, to improvements in such apparatus whereby the characteristics of a reproduced color video picture are controlled automatically in accordance with a transmitted reference signal or, in the absence of such a reference signal, in accordance with manual controls.

In a conventional NTSC composite color television signal, monochrome information, that is, the brightness information of the video picture, is transmitted by the luminance signal and the color information is transmitted by the chrominance signal. This color information is amplitude modulated on a subcarrier, and different color information components are modulated onto different phases of the subcarrier. The composite color video signal also includes periodic horizontal synchronizing signals and color burst signals which are used at the television receiver to control a local oscillator for chrominance signal demodulation such that the frequency and phase of the local oscillating signal are synchronized with that of the burst signal. For this purpose, the color burst signal is formed of approximately eight cycles of the color subcarrier which is superimposed onto the pedestal level during the horizontal synchronizing interval of the video signal. The composite video signal also includes vertical synchronizing information which is present during a number of horizontal line intervals that form the vertical retrace interval.

As aforementioned, the purpose of the color burst signal is to synchronize a local oscillator in a color television receiver so that the local oscillator output can be used to demodulate the received chrominance component with sufficient fidelity such that the reproduced color video picture is an accurate image of the original transmitted picture. However, a transmitted composite color video signal may be subjected to various phase and/or amplitude distortions. Such distortions may be caused directly at the transmitting site or may be attributed to the signal transmission path. Although the burst signal should be able to synchronize the local oscillator at the color television receiver to match or track such distortions, there is the possibility that the burst signal and the modulated color subcarriers may be subjected to different distortions. That is, since the burst signal is provided on the pedestal level and the color-modulated subcarrier is provided on quite different levels, the amplitude and phase distortion at the pedestal level might differ from such distortion at the other level. Consequently, even though this distortion in the burst level can be detected and corrected, such correction may not fully account for the distortions in the subcarrier at the other level. Similarly, transmission distortions may deleteriously affect the luminance component, resulting in noticeable defects in the reproduced video picture.

One proposal to minimize subcarrier distortion, which may not be fully corrected by synchronizing the local oscillator at the television receiver to the received burst signal, is to provide a further reference signal in the transmitted composite color video signal. This reference signal is known as the vertical interval reference signal, or VIR signal, and is formed of a reference chrominance component constituted by a subcarrier, equal in frequency and phase to the burst signal, transmitted during a selected portion of the vertical retrace interval. The VIR signal also includes a luminance reference component and a black level reference component. It has been suggested that this VIR signal can be transmitted during the nineteenth or twentieth horizontal line interval which, as is known, is included in the vertical retrace interval. Essentially, the VIR subcarrier reference signal differs from the burst signal in that it exists for a longer duration and is superimposed on a level other than the pedestal level.

It is expected that, when a transmitted video signal having the VIR signal is received, the various reference information provided by the VIR signal can be used to control the color television receiving apparatus such that the reproduced color picture exhibits optimum color characteristics. That is, this VIR signal can be used to control the phase of the generated local oscillator which, as is known, determines the hue or tint of the color picture. Also, the information provided by this VIR signal can be used to control the level of the received chrominance component which, as is known, controls the saturation of the reproduced color picture. Therefore, by automatically controlling the local oscillator phase and chrominance component level in accordance with optimum standards, such as the NTSC standard, as represented by the VIR signal, a corresponding optimum color video picture can be reproduced. One type of color control circuitry is described in copending application 753,868, filed on Dec. 23, 1976 by the inventors of the instant invention.

In the aforementioned application, suitable control apparatus is provided to permit the color characteristics of the video picture to be controlled in accordance with a viewer's preferences, whether or not the transmitted composite color television signal includes the VIR signal. It also is desirable to utilize the luminance and black level information in the VIR signal to control the luminance level of the reproduced video picture; and such luminance level control should be subject to a viewer's subjective preferences in the absence of the VIR signal.

OBJECTS OF THE INVENTION

Therefore, it is an object of the present invention to provide improved color television receiving apparatus which is responsive to and utilizes a transmitted VIR signal for controlling the characteristics of a reproduced color picture.

Another object of this invention is to provide improved color television receiving apparatus which is responsive to a VIR signal and which also provides a manual adjustment to enable the viewer to selectively adjust the reproduced color picture in accordance with his own particular preferences if the transmitted composite color television signal is not provided with a VIR signal.

A further object of this invention is to provide chrominance and luminance control circuitry which can be used to control the color and brightness of a color television picture reproduced by a color television receiving apparatus whether or not a transmitted composite color video signal includes a VIR signal.

An additional object of this invention is to provide luminance and hue and saturation control circuitry for use in a color television receiving apparatus, this circuitry being responsive to a transmitted VIR signal and also being manually adjustable in the event that a VIR signal is not transmitted.

Yet another object of this invention is to provide an improved sampling circuit which can be used with the picture control apparatus of a television receiver, the sampling circuit exhibiting a high sampling speed while including a storage capacitor of relatively high capacitance.

Various other objects, advantages and features of the present invention will become readily apparent from the ensuing detailed description, and the novel features will be particularly pointed out in the appended claims.

SUMMARY OF THE INVENTION

In accordance with the present invention, color television receiving apparatus is provided for receiving and demodulating a composite color television signal having horizontal synchronizing signals, color burst signals and luminance and chrominance components, the composite color television signal being of the type which additionally may or may not include a VIR signal provided in a predetermined line interval during the vertical retrace interval. This apparatus includes signal processing circuitry to provide a video picture from the received composite color television signal; a signal generator for generating sampling signals during the predetermined line intervals in which the VIR signal is expected; a detector coupled to the signal processing circuitry to detect if the VIR signal is included in the received composite color television signal; sampling circuitry responsive to the sampling signals for sampling at least one component produced by the signal processing circuitry to produce sampled control signals; manual controls for producing manually adjustable control signals; a switching circuit coupled to the sampling circuitry and to the manual controls and responsive to the detector for transmitting the sampled control signals if the VIR signal is detected and for transmitting the manual control signals if the VIR signal is not detected; and control circuits coupled to the switching circuit and responsive to the control signals selectively transmitted by the switching circuit for controlling predetermined characteristics of the reproduced color video picture. In accordance with one aspect of this invention, both the sampled and manual control signals relate to luminance and chrominance information, and the control circuits control the luminance level and the hue and saturation of the reproduced video picture. In accordance with another aspect of this invention, an improved sampling circuit is provided.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
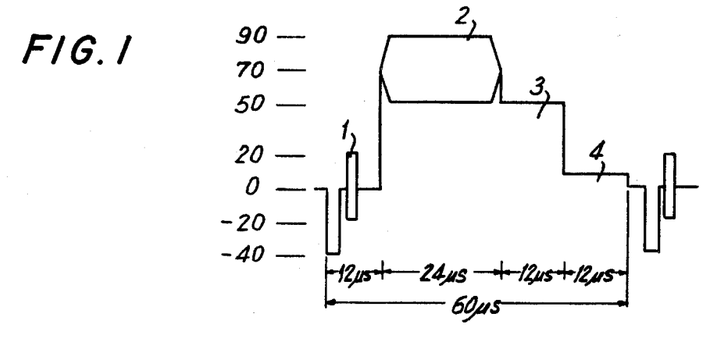
FIG. 1 is a graphic representation of a proposed VIR signal to be transmitted in a composite color television signal.

Before describing the color television receiving apparatus which advantageously utilizes the VIR signal, the VIR signal itself first will be considered. As mentioned above, it has been proposed that this VIR signal be transmitted during line 19 of the composite television signal. However, it could be transmitted during a different line interval, such as line 20, or on both lines 19 and 20 so as to be included in both fields. As shown in FIG. 1, the line interval during which the VIR signal is transmitted includes the normal blanking and horizontal synchronizing pulses, as well as the color burst signal. The levels of the different components shown in FIG. 1 are expressed in IRE units wherein the difference between the blanking level and zero carrier is 100 units. The horizontal synchronizing pulse is shown as a negative pulse of 40 units amplitude, and this pulse is followed by the burst signal 1 provided on the blanking or pedestal level of 0 units. As is conventional, burst signal 1 is sinusoidal whose frequency is equal to the subcarrier frequency of 3.58 MHz. Typically, the burst signal is present for approximately eight cycles. The peak-to-peak amplitude of this burst signal is 40 units and its phase is coincident with the $-(B-Y)$ axis.

Approximately 12 $\mu$ sec after the beginning of this VIR signal is the chrominance reference component 2 which is formed of unmodulated subcarrier whose frequency is 3.58 MHz and whose phase is the same as the burst signal, that is, coincident with the $-(B-Y)$ axis. This chrominance reference component is provided on a level of 70 units and exists for a duration of approximately 24 $\mu$ sec. Following this chrominance reference component, a luminance reference level 3 of 50 units is provided for 12 $\mu$ sec which, in turn, is followed by a black reference level 4 having a level of 7.5 units and extending for 12 $\mu$ sec. The approximate duration from the start of the horizontal synchronizing pulse to the termination of the black reference level is 60 $\mu$ sec.

Figure 2:
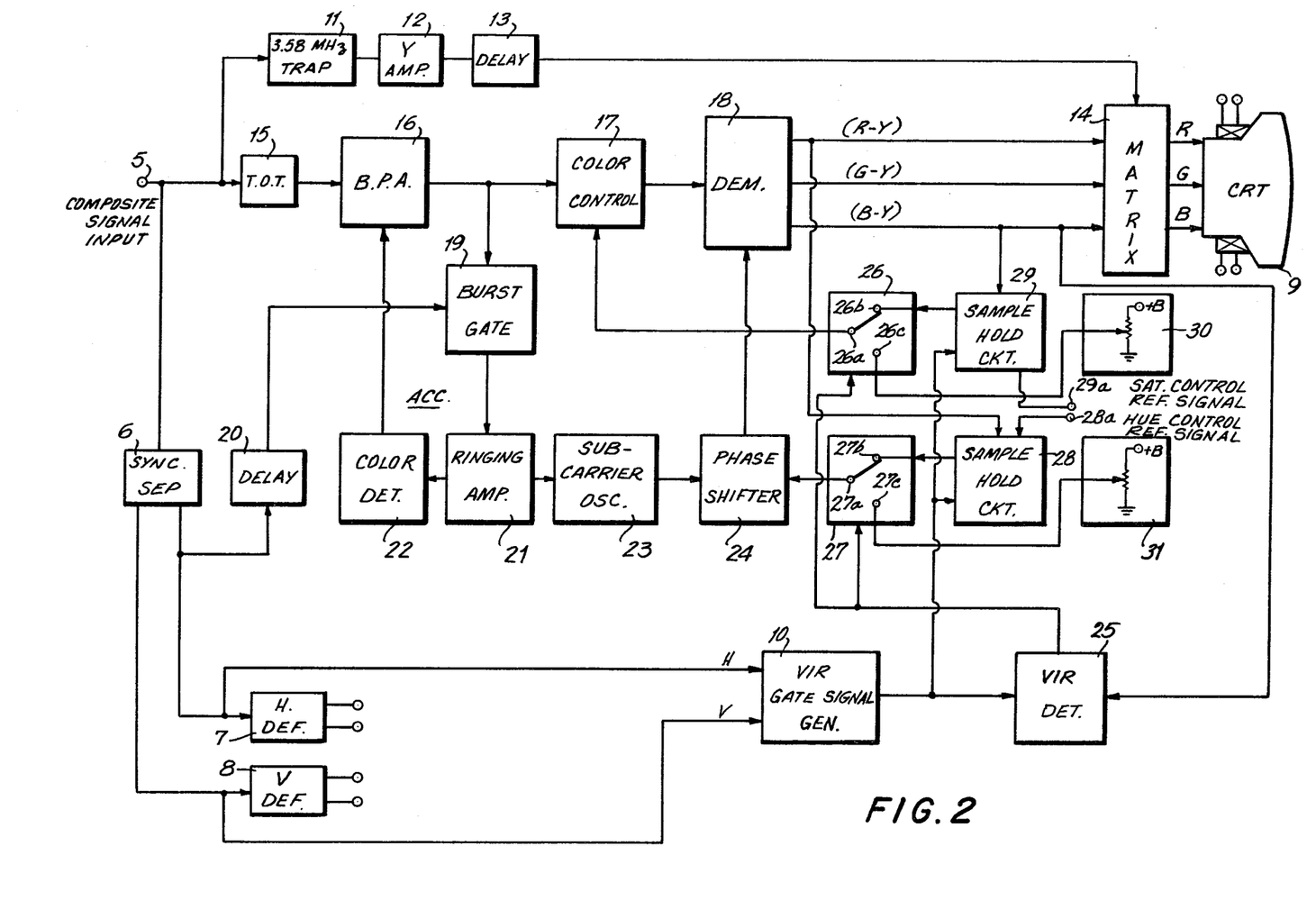
FIG. 2 is a block diagram of one embodiment of color television receiving apparatus which utilizes this VIR signal.

Turning now to FIG. 2, there is illustrated a block diagram of a preferred embodiment of apparatus which can be used for receiving a transmitted composite color television signal and for producing a color television picture in response thereto. The apparatus includes an input terminal 5 for receiving the composite color television signal, a luminance signal processing channel including a luminance amplifier 12, a chrominance signal processing channel including a demodulator 18, a synchronizing signal separator circuit 6, a matrix circuit 14 for combining the luminance signal and respective color signal components produced by demodulator 18 and a color cathode ray tube 9 for displaying the color television picture. Luminance amplifier 12 is described in greater detail with respect to FIG. 3 and is adapted to amplify the luminance component which is included in the composite color television signal and to apply this amplified luminance component to matrix circuit 14. Accordingly, luminance amplifier 12 is coupled to input terminal 5 through a high frequency trap circuit 11 which is adapted to prevent the chrominance component, which is formed of color signal components modulated onto a 3.58 MHz subcarrier, thereby separating the luminance component from the received composite color television signal. As will be described, luminance amplifier 12 includes gain control circuitry for setting appropriate luminance levels ranging from a black level to a white level. The amplified luminance component is supplied from luminance amplifier 12 through a delay circuit 13 to matrix circuit 14. Delay circuit 13 is provided to impart a suitable delay to the amplified luminance component such that it is applied to the matrix circuit with the proper phase relation relative to the color signal component produced by demodulator 18.

Synchronizing signal separator circuit 6 is a conventional circuit coupled to input terminal 5 and adapted to separate the horizontal and vertical synchronizing signals from the received composite color television signal. These separated signals are applied to horizontal sync detector 7 and vertical sync detector 8 which, in turn, produce suitable signals for driving the CRT beam deflection yokes disposed about cathode ray tube 9. The horizontal and vertical sync signal output terminals of synchronizing signal separator 6 also are coupled to a VIR gate signal generator 10 which is adapted to produce various sampling signals during the horizontal line interval in which the VIR signal is expected. VIR gate signal generator 10 thus may include a counting circuit for counting horizontal sync signals and for producing the respective sampling signals after the nineteenth horizontal sync signal has been counted, that is, during the nineteenth horizontal line interval. VIR gate signal generator 10 thus may include suitable delay circuits and signal shaping circuits such that a chrominance reference sampling signal is produced to coincide with chrominance reference component 2 (FIG. 1), a luminance reference sampling signal to coincide with luminance reference component 3 and a black reference sampling signal to coincide with black reference component 4. Such delay and shaping circuits are readily known to one of ordinary skill in the art.

The chrominance component included in the received composite color television signal is separated therefrom by the so-called take-off-transformer 15 which is coupled to input terminal 5. A band pass amplifier 16 is coupled to take-off-transformer 15 and is adapted to amplify the separated chrominance component and to supply this chrominance component through a level control circuit 17 to demodulator 18. The demodulator is conventional and is adapted to demodulate the chrominance component into its respective (R-Y), (G-Y) and (B-Y) color difference signals produced at respective outputs of the demodulator. To this effect, demodulator 18 is supplied with a local oscillating signal whose frequency is the same as the subcarrier frequency and whose phase should be aligned with a predetermined color difference axis, such as the (B-Y)

axis. A suitable local oscillating signal is produced by a burst gate 19, ringing amplifier 21, oscillator 23 and phase-shifter 24 connected in cascade between the output of band pass amplifier 16 and demodulator 18. Burst gate 19 includes a gating input coupled to the horizontal sync signal output of synchronizing signal separator circuit 6 via delay circuit 20. The delay circuit is adapted to delay the horizontal sync signal, shown in FIG. 1, so as to coincide with burst signal 1. Accordingly, burst gate 19 is conditioned to transmit the burst signal component included in the chrominance component amplified by band pass amplifier 16 to ringing amplifier 21. This ringing amplifier is conventional and is adapted to resonate at the 3.58 MHz burst (or subcarrier) frequency. This 3.58 MHz ringing signal synchronizes oscillator 23 to produce a 3.58 MHz local oscillating signal which, in turn, is supplied to demodulator 18 via a controllable phase shifter 24 so as to demodulate the amplified chrominance component into its respective color difference signals.

An output of ringing amplifier 21 also is connected to a level detector 22 which is adapted to detect the level of the gated burst signal, as represented by the ringing signal. Level detector 22 is, in turn, coupled to band pass amplifier 16 for controlling the gain of this amplifier in accordance with the detected burst level. Thus, the combination of burst gate 19, ringing amplifier 21 and level detector 22 functions as an automatic color control (ACC) circuit. This ACC circuit operates to maintain the gain of band pass amplifier 16 at a suitable level such that the amplified chrominance component is properly amplified.

With the color receiving apparatus just described, the respective color difference signals produced by demodulator 18 are combined with the amplified luminance signal in matrix circuit 14 to produce individual R, G and B color signals which control the red, green and blue electron beams, respectively, in cathode ray tube 9. This results in a reproduced color television picture corresponding to the luminance and chrominance information contained in the received composite color television signal. The brightness of the reproduced picture is dependent upon the amplified luminance signal, as produced by luminance amplifier 12; and the color characteristics of this picture are dependent upon the color difference signals produced by demodulator 18. The hue or tint of the picture is a function of the phase of the local oscillating signal applied to demodulator 18. If this local oscillating signal is precisely in phase with the color subcarrier, then the hue of the reproduced picture will correspond to that of the original, as represented by the composite color television signal. Also, the color saturation of the reproduced color picture is dependent upon the magnitude of the chrominance component applied to demodulator 18. However, if the transmitted composite color television signal is subjected to distortion such that the phase of the color subcarrier differs from that of the local oscillating signal or if the magnitude of the chrominance component applied to demodulator 18 differs from its proper level, then the hue and saturation characteristics of the reproduced color picture will differ from their optimum standard levels as represented by the originally transmitted composite color television signal. Even if the transmitted signal does not experience distortion, a change in various parameters of the receiving apparatus may affect the phase of the local oscillating signal and the magnitude of the amplified chrominance component.

One purpose of the transmitted VIR signal is to control the phase of the local oscillating signal and the level of the chrominance component in accordance with optimum standards such that the hue and saturation of the reproduced color television picture will correspond to such standards. However, if the transmitted composite color television signal, as received at input terminal 5, does not include the VIR signal, it is advantageous to provide manual controls for changing or correcting the hue and saturation characteristics of the reproduced color television picture in accordance with a viewer's preferences. To this effect, sampling circuit 28, manual control 31 and switching circuit 27 are provided to selectively control phase shifter 24 in accordance with a received VIR signal or pursuant to a manual adjustment so as to control or correct the hue of the reproduced television picture. Similarly, sample circuit 29, manual control 30 and switching circuit 26 are provided to selectively control level control circuit 17 in accordance with the VIR signal or with a manual adjustment so as to correspondingly control or correct the color saturation of the reproduced color picture.

More particularly, sample circuit 28 includes a signal input coupled to the (R-Y) output produced by demodulator 18 and a sampling signal input coupled to VIR gate signal generator 10. The sampling signal applied to sample circuit 28 coincides with chrominance reference component 2 (FIG. 1) in the VIR signal such that the (R-Y) color different component produced by demodulator 18 in response to a received VIR signal is sampled. This sampled component is supplied as a hue control signal to switching circuit 27 and, as diagrammatically illustrated, to a fixed contact 27b to which movable contact 27a of the switching circuit is selectively engaged. A manually adjustable control signal is supplied from a suitable manual control circuit 31, which may include a potentiometer, to another fixed contact 27c of switching circuit 27. Thus, depending upon the particular fixed contact with which movable contact 27a is in engagement, the appropriate control signal is applied to phase shifter 24 so as to control the phase of the local oscillating signal, thereby controlling the hue of the reproduced color television picture.

Sample circuit 29 is similar to sample circuit 28 and includes a signal input coupled to the (B-Y) output of demodulator 18, and a sampling signal input coupled to VIR gate signal generator 10 so as to receive the sampling circuit which is coincident with chrominance reference component 2 of the VIR signal. The sampled (B-Y) color difference component, that is, the (B-Y) component produced by demodulator 18 in response to the VIR signal, is supplied to switching circuit 26, such as diagrammatically illustrated fixed contact 26b. Another fixed contact 26c is adapted to receive a manually adjustable saturation control signal produced by manual control 30 which, for example, may include a potentiometer. A movable contact 26a is adapted to selectively engage either contact 26b or contact 26c to supply a corresponding saturation control signal to level control circuit 17. This saturation control signal is capable of controlling or correcting the level of the chrominance component applied to demodulator 18, thereby controlling the color saturation of the reproduced color television picture.

Switching circuits 26 and 27 are controlled by a VIR detector 25. This VIR detector includes an input coupled to the (B-Y) output of demodulator 18 and is energized by the chrominance reference sampling signal produced by VIR gate signal generator 10 to detect whether the transmitted composite color television signal includes a VIR signal. If a VIR signal is detected, VIR detector 25 controls switching circuits 26 and 27 so that their respective movable contacts 26a and 27a engage fixed contacts 26b and 27b, respectively. If VIR detector 25 does not detect a VIR signal, the detector controls switching circuits 26 and 27 such that their movable contacts 26a and 27a engage fixed contacts 26c and 27c, respectively. Thus, switching circuits 26 and 27 are selectively controlled to apply corresponding saturation and hue control signals to level control circuit 17 and phase shifter 24 depending upon whether or not a VIR signal is transmitted.

Sample circuits 28 and 29 also include additional input terminals 28a and 29a, respectively. These input terminals are adapted to receive hue and saturation reference signals, respectively, to which the sampled (R-Y) and (B-Y) components are compared. These reference signals can be manually adjusted so as to be equal to optimum standard reference signals. However, if a viewer prefers hue and saturation characteristics which differ from such optimum standards, the manual adjustment capability permits the color characteristics of the reproduced picture to correspond to those preferences. This feature is described in greater detail in copending application Ser. No. 753,868.

In operation, let it be assumed that the received composite color television signal applied to input terminal 25 includes a VIR signal. The luminance component is separated from this composite signal and supplied through trap circuit 11 to luminance amplifier 12 so as to be suitably amplified and supplied to matrix circuit 14. As will be described below with respect to FIG. 3, the gain of luminance amplifier 12 is controlled in response to the luminance reference level and black reference level included in the VIR signal.

The chrominance component included in the received composite signal is amplified by gain-controlled band pass amplifier 16 and is supplied through level control circuit 17 to demodulator 18 whereat the respective color difference components are demodulated and supplied to matrix circuit 14. The ACC operation performed by burst gate 19, ringing amplifier 21 and level detector 22 has been described above and need not be repeated. During the line interval in which the VIR signal is provided, the (B-Y) component produced by demodulator 18 exhibits a predetermined level and the (R-Y) component produced by the demodulator ideally exhibits a zero level. This is because the chrominance reference component 2 (FIG. 1) consists of an unmodulated subcarrier whose phase coincides with the −(B-Y) axis. Thus, if the phase of the local oscillating signal applied to demodulator 18 by oscillator 23 is correct, then the (R-Y) component should be of zero magnitude because of the phase quadrature of this component. The (B-Y) component will exhibit a particular magnitude corresponding to the level of the chrominance component applied to demodulator 18.

The (R-Y) component produced by demodulator 18 is sampled by sample circuit 28 in response to the chrominance reference sampling signal generated by VIR gate signal generator 10. This sampled level is compared to the hue reference level applied to terminal 28a, and the difference therebetween is supplied through switching circuit 27 as a hue control signal to phase shifter 24. Thus, the phase of the local oscillating signal applied to demodulator 18 is controlled such that the demodulated (R-Y) component produced in response to the VIR signal is equal to the hue reference signal. In one embodiment, this hue reference signal represents the optimum standard and, therefore, is of zero level. However, this reference level can be suitably adjusted by a viewer to correspond to his particular preference.

In similar fashion, the chrominance reference sampling signal produced by VIR gate signal generator 10 energizes sample circuit 29 to sample the (B-Y) component produced by demodulator 18 in response to the VIR signal. This sampled component is compared to the saturation reference signal applied to terminal 29a, and the difference therebetween is supplied through switching circuit 26 to level control circuit 17 to correspondingly establish the level of the chrominance component, and thus the color saturation of the reproduced television picture. Here, too, the saturation reference signal may be manually adjusted such that the color saturation of the reproduced picture corresponds to a viewer's preference.

In the foregoing, it has been assumed that the VIR signal is transmitted; so that the (B-Y) component produced by demodulator 18 in respose to this VIR signal is detected by VIR detector 25. In response to this detected VIR signal, switching circuits 26 and 27 are controlled to transmit the sampled control signals to level control circuit 17 and phase shifter 24, respectively. As will be described below, VIR detector 25 detects the level of the (B-Y) component as corresponding to that of the VIR signal. However, if the VIR signal is not transmitted, it is appreciated that the (B-Y) component substantially differs from this level. In that event, switching circuits 26 and 27 are controlled to transmit the manual saturation and hue reference signals from manual controls 30 and 31 to level control circuit 17 and phase shifter 24, respectively. Therefore, it is not necessary to provide viewer-operated switching circuits to selectively apply automatic or manual control signals to the saturation and hue control circuits. Rather, this switching is performed automatically, depending upon the presence or absence of the VIR signal.

Figure 3:
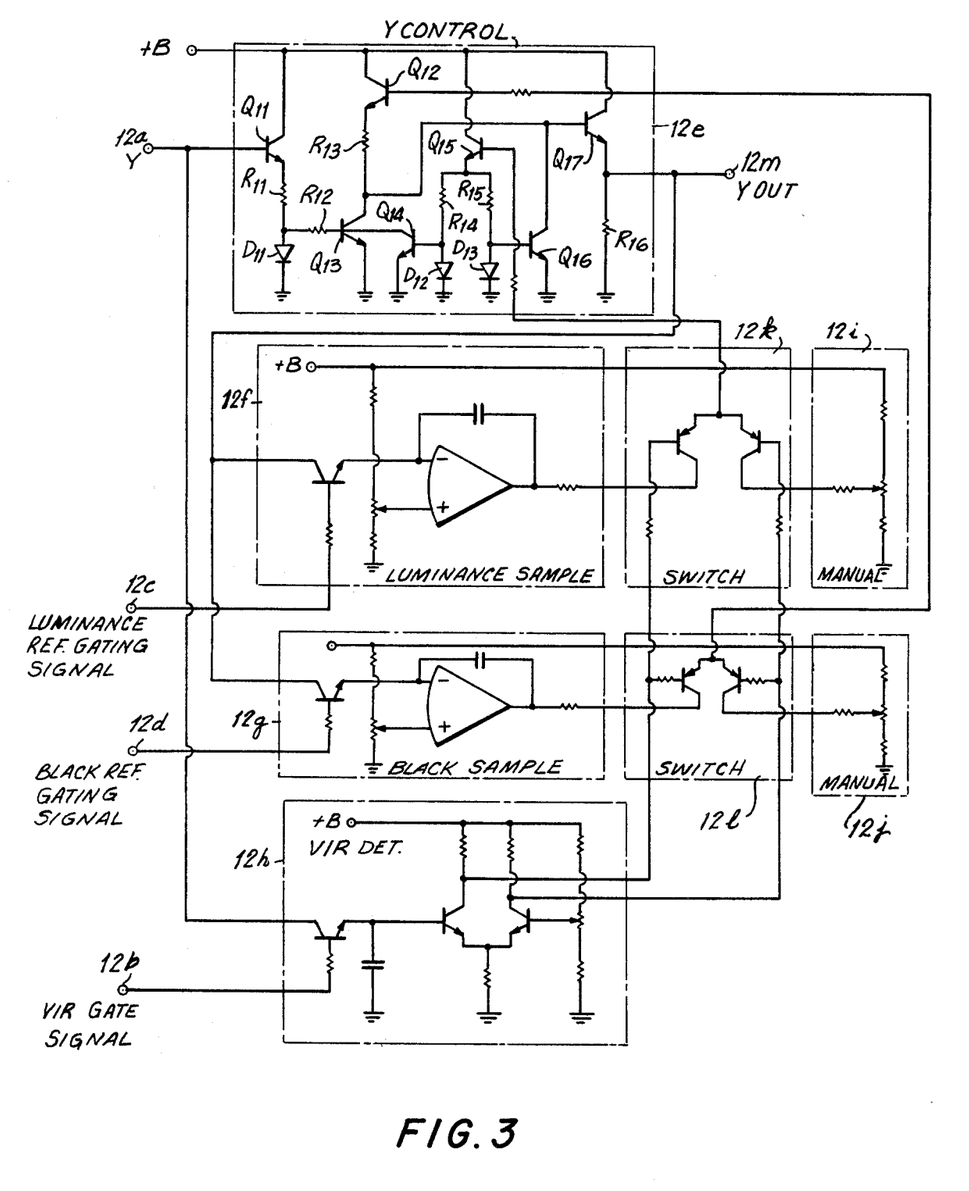
FIG. 3 is a schematic diagram of one of the blocks included in the apparatus shown in FIG. 2.

One embodiment of luminance amplifier 12 is shown schematically in FIG. 3. This amplifier is comprised of a gain-controlled amplifier 12e having an input terminal 12a to receive the luminance signal and an output terminal 12m to produce a suitably amplified, level-controlled luminance signal. The lower level of the amplified luminance signal is adjusted to be substantially equal to the black reference level 4 (FIG. 1) and the gain of amplifier 12e is automatically controlled in accordance with the luminance reference level 3. As shown, amplifier 12e includes an input transistor $Q_{11}$ coupled to input terminal 12a and connected in emitter-follower configuration to supply a level-shifted luminance signal from a junction defined by emitter resistor $R_{11}$ and a diode $D_{11}$ through a resistor $R_{12}$ to the base electrode of a transistor $Q_{13}$. This transistor is adapted to amplify the level-shifted luminance signal and apply same to an output emitter-follower $Q_{17}$.

The base bias potential of transistor $Q_{13}$ is controlled by a transistor $Q_{14}$ whose collector-emitter circuit is connected in parallel with the base-emitter circuit of transistor $Q_{13}$. Also, the collector current of transistor $Q_{13}$ is controlled by a transistor $Q_{12}$ which is connected in series with a resistor $R_{13}$ and a collector load for transistor $Q_{13}$.

The signal applied to the base electrode of transistor $Q_{17}$ is controlled by a transistor $Q_{16}$ whose collector-emitter circuit is connected in shunt relation with the base electrode of transistor $Q_{17}$. The collector-emitter impedances of transistors $Q_{14}$ and $Q_{16}$ are controlled by a transistor $Q_{15}$ whose collector-emitter current is divided between two parallel paths formed of resistor $R_{14}$ and diode $D_{12}$ and resistor $R_{15}$ and diode $D_{13}$, respectively. The voltage across diode $D_{12}$ controls the conductivity of transistor $Q_{14}$; and the voltage across diode $D_{13}$ controls the conductivity of transistor $Q_{16}$. Thus, depending upon the potential applied to the base electrode of transistor $Q_{15}$, the base potentials of transistors $Q_{13}$ and $Q_{17}$ are correspondingly controlled by the conductivity of transistors $Q_{14}$ and $Q_{16}$, respectively.

The conductivity of transistor $Q_{12}$ is determined by the sampled black reference component included in the VIR signal or, in the absence of a VIR signal, by a manual black reference signal produced by a manual control 12j. Transistor $Q_{15}$ is controlled by the luminance reference component included in the VIR signal or, in the absence of a VIR signal, by a manually adjustable luminance reference signal produced by a manual control 12i. To this effect, a sampling circuit 12f, such as a sample-and-hold circuit, includes a signal input terminal coupled to output terminal 12m of amplifier 12e, and a sampling input terminal 12c adapted to receive a luminance reference sampling signal. The luminance reference sampling signal is produced by VIR gate signal generator 10 to coincide with the luminance reference component 3 included in the VIR signal shown in FIG. 1. The illustrated sample-and-hold circuit 12f is similar to sample circuit 28 (FIG. 2) and its circuit construction and operation is described in greater detail with respect to FIG. 4. The luminance component which is sampled and stored by sample-and-hold circuit 12f is supplied through a switching circuit 12k to the base electrode of transistor $Q_{15}$. As shown, switching circuit 12k is comprised of a pair of transistors whose emitter electrodes are connected in common and whose base electrodes are coupled to a VIR detector 12h which selectively determines the particular transistor that is conductive. That is, one transistor included in switching circuit 12k is coupled to sample-and-hold circuit 12f and the other transistor is coupled to manual control 12i. Depending upon which of these transistors is conductive, either the sampled signal or the manually adjustable signal is transmitted to transistor $Q_{15}$.

A sampling circuit 12g, such as a sample-and-hold circuit similar to circuit 12f, includes a signal input terminal coupled to output terminal 12m of amplifier 12e and a sampling signal input coupled to terminal 12d for receiving a black reference sampling signal produced by VIR gate signal generator 10. This sampling signal is provided in coincidence with black reference component 4 included in the VIR signal shown in FIG. 1. A switching circuit 12l, similar to switching circuit 12k, is selectively controlled by VIR detector 12h and includes one input coupled to receive the luminance component sampled and stored in sample-and-hold circuit 12g and another input connected to manual control 12j so as to receive the manually adjustable black reference signal. Thus, depending upon whether a VIR signal is detected, switching circuit 12l supplies a control signal to the base electrode of transistor $Q_{12}$ included in amplifier 12e, which control signal either is derived from the luminance component sampled by sample-andhold circuit 12g or is the manually adjustable control signal produced by manual control 12j.

Although switching circuits 12k and 12l can be controlled by VIR detector 25 (FIG. 2), a separate VIR detector 12h is shown. This circuit is similar to VIR detector 25, described in greater detail with respect to FIG. 4, and includes a signal input terminal coupled to terminal 12a to receive the separated luminance component, and a sampling signal input coupled to terminal 12b to receive a VIR gate signal. As an example, the VIR gate signal applied to terminal 12b may be produced to coincide with luminance reference component 3 (FIG. 1) such that the luminance component applied to terminal 12a is sampled at the appropriate time during the VIR interval. This sampled luminance component is compared to a reference level by a differential amplifier, as shown, and the result of this comparison is used to correspondingly energize switching circuits 12k and 12l. That is, if the VIR signal is transmitted, the sampled luminance component exceeds the reference level such that the differential amplifier included in VIR detector 12h renders the transistors coupled to sample-and-hold circuits 12f and 12g, respectively, conductive. However, if the transmitted composite color television signal does not include the VIR signal, then the luminance component applied to terminal 12a and sampled by VIR detector 12h does not exceed the pre-established reference level. Consequently, the differential amplifier included in VIR detector 12h energizes the transistors included in switching circuits 12k and 12l and connected to manual controls 12i and 12j, respectively, to be conductive. Thus, depending upon whether a VIR signal is detected, amplifier 12e is suitably controlled either by the luminance reference component and black reference component included in the VIR signal or by the manually adjustable control signals provided by manual controls 12i and 12j.

Figure 4:
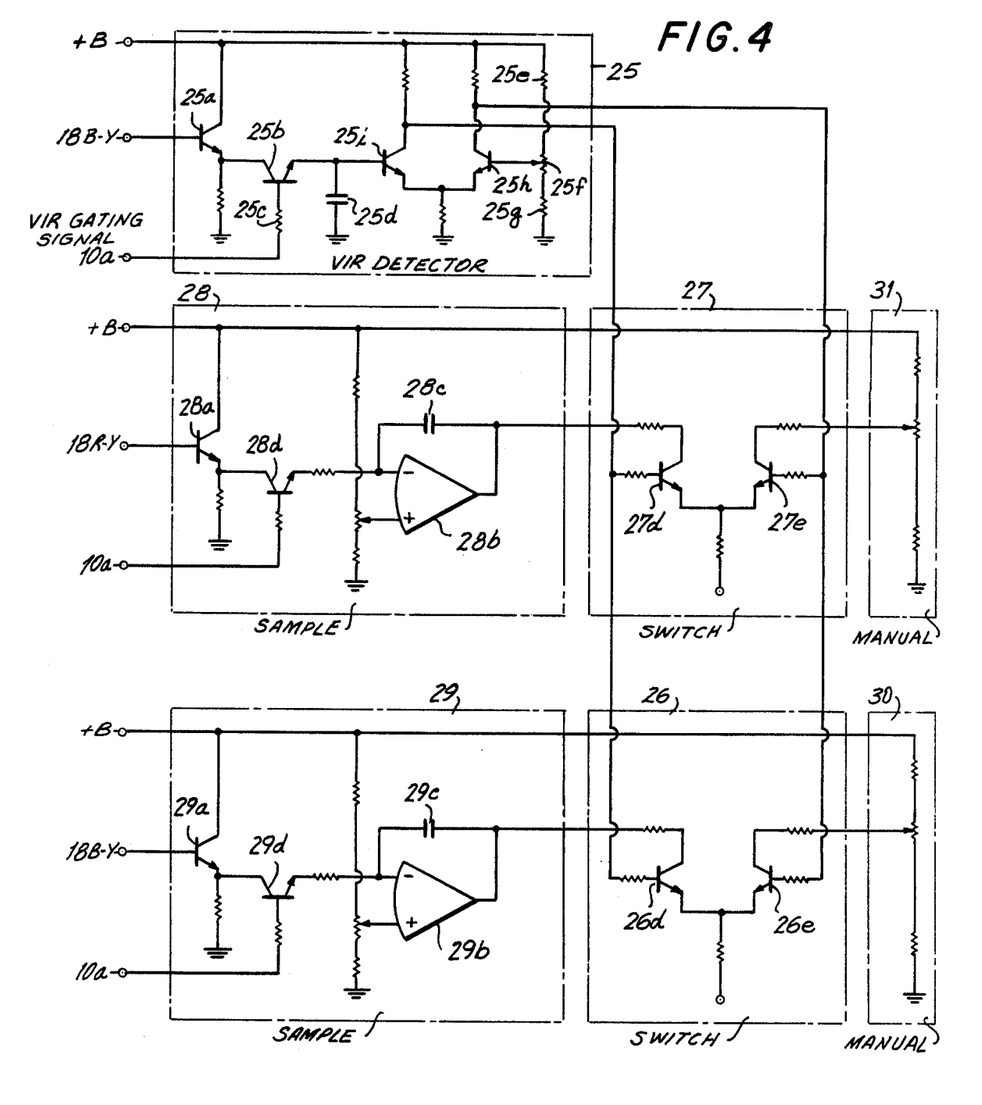
FIG. 4 is a schematic diagram of various blocks included in the color control portion of the apparatus shown in FIG. 2.

One embodiment of VIR detector 25, sample circuits 28 and 29, switching circuits 26 and 27 and manual controls 30 and 31 is shown schematically in FIG. 4. VIR detector 25 is comprised of an input transistor 25a connected in emitter-follower configuration and having its base electrode coupled to the (B-Y) output of demodulator 18. A sampling transistor 25b has its collector electrode connected to receive the output of emitter-follower 25a and its base electrode coupled through a resistor 25c to a terminal 10a for receiving the VIR gating signal produced by VIR gate signal generator 10. As discussed previously, this gate signal is coincident with the chrominance reference component 2 of the VIR signal shown in FIG. 1. The emitter output of transistor 25b is coupled to a storage capacitor 25d. The voltage stored across this capacitor is coupled to the base electrode of a transistor 25i which is connected with another transistor 25h in differential amplifier configuration. Transistor 25h is supplied with a reference level produced by a resistive voltage-divider formed of resistors 25e, 25f and 25g, with resistor 25f being adjustable, such as a potentiometer. The voltages produced at the collector electrodes of transistors 25h and 25i are supplied to switching circuits 26 and 27 for selectively controlling the switching states of these switching circuits.

In operation, the (B-Y) color difference component produced by demodulator 18 in response to the chrominance reference component of the VIR signal is of a particular magnitude. Typically, this magnitude may be of negative polarity or may be of a level less than the reference level applied to the base electrode of transistor 25h by the illustrated resistive voltage-divider. Thus, when transistor 25b is rendered conductive in response to the VIR gating signal, capacitor 25d is charged to a voltage which is less than the voltage applied to transistor 25h. Consequently, when the VIR signal is present, transistor 25h is conductive and transistor 25i is not conductive. Therefore, transistor 25i applies a relatively high voltage to switching circuits 26 and 27; while transistor 25h applies a relatively lower voltage to these switching circuits. The reference level applied to transistor 25h by the resistive voltage divider is selected such that this level is less than the (B-Y) component produced by demodulator 18 during the nineteenth line interval in the event that the VIR signal is not transmitted. Thus, in the absence of a VIR signal, capacitor 25d is charged to a level which exceeds the voltage level applied to transistor 25h. Therefore, when VIR detector 25 detects the absence of a VIR signal, transistor 25i is conductive to apply a relatively lower voltage to switching circuits 26 and 27 than the voltage applied to these switching circuits by non-conductive transistor 25h.

Sample circuits 28 and 29 are of similar construction and, in the interest of brevity, only sample circuit 28 will be described. This circuit, which is similar to sample-and-hold circuits 12f and 12g, is comprised of an input transistor 28a whose base electrode is coupled to the (R-Y) output of demodulator 18 and which is connected in emitter-follower configuration. A sampling transistor 28d has its collector-emitter circuit connected in series to receive the emitter output of emitter-follower 28a and, when conductive, transistor 28d applies this emitter output to a storage circuit. The base electrode of transistor 28d is coupled to VIR gating signal generator 10 so as to receive the VIR gating signal discussed above.

The storage circuit coupled to sampling transistor 28d is comprised of an operational amplifier having inverting and non-inverting inputs. As illustrated, the inverting input is coupled to sampling transistor 28d and the non-inverting input is supplied with a manually adjustable reference level. A holding capacitor 28c is interconnected between the operational amplifier output and its inverting input. In this configuration, the sample storage circuit is a differential integrator, also known as the so-called mirror integrator. Since the gain of operational amplifier 28b is relatively high, then even if the capacitance of capacitor 28c is low, the voltage stored by this capacitor can be maintained at a relatively constant level for a long duration. Hence, the (R-Y) component, which is sampled periodically, is stored with good linearity and fidelity.

If the (R-Y) component applied to emitter-follower 28a exceeds the previously sampled (R-Y) component, then capacitor 28c is charged through the forward resistance of sampling transistor 28d. Conversely, if the (R-Y) component applied to emitter-follower 28a is less than the previously sampled (R-Y) component, then capacitor 28c effectively is discharged through the reverse resistance of sampling transistor 28d. It is best that these forward and reverse resistances of transistor 28d be equal so that the charge and discharge time constants of the storage circuit are equal.

Figure 5:
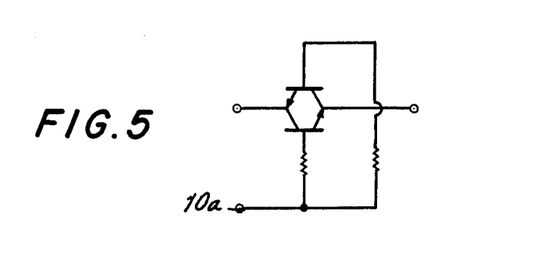
FIG. 5 is a schematic diagram of another embodiment of a portion of the circuit shown in FIG. 4.

Although sampling transistor 28d is shown as a bipolar switching transistor, in an alternative embodiment, this transistor is a field effect device. In a still further embodiment, the illustrated single sampling transistor is replaced by symmetrical transistors connected as shown in FIG. 5. In this symmetrical arrangement, capacitor 28c is charged toward a more positive level by one of these switching transistors and is discharged toward a more negative level by the other switching transistor.

Sample circuit 29 is substantially identical to sample circuit 28 except that emitter-follower 29a is supplied with the (B-Y) component produced by demodulator 18; whereas emitter-follower 28a is supplied with the (R-Y) component. Thus, operational amplifier 28b provides a sampled control signal that is proportional to the difference between the (R-Y) component produced by demodulator 18 in response to the chrominance reference component of the VIR signal and a hue reference level which is applied to the non-inverting input of the operational amplifier. Similarly, operational amplifier 29b produces a sampled control signal that is proportional to the difference between the (B-Y) component produced by demodulator 18 in response to the chrominance reference component of the VIR signal and a saturation reference level which is applied to the non-inverting input of the operational amplifier.

Switching circuits 26 and 17 are substantially identical and, in the interest of brevity, only switching circuit 27 will be described. This switching circuit is comprised of a pair of transistors 27d and 27e whose emitter electrodes are connected in common to an output and whose collector electrodes are connected to sample circuit 28 and to manual control 31, respectively. Thus, transistor 27d is supplied with the sampled hue control signal and transistor 27e is supplied with a manually adjustable hue control signal, this manually adjustable control signal being determined by the setting of the illustrated potentiometer included in the resistive voltage divider comprising manual control 31. The base electrode of transistor 27d is coupled to the collector electrode of transistor 25i included in VIR detector 25; and the base electrode of transistor 27e is coupled to the collector electrode of transistor 25h. It is recalled that, if a VIR signal is detected, the collector potential of transistor 25i is sufficient to render transistor 27d conductive. Conversely, if a VIR signal is not detected, the collector potential of transistor 25h is sufficient to render transistor 27e conductive. Thus, the sampled control signal produced by sample circuit 28 is supplied through transistor 27d to the output of switching circuit 27 if a VIR signal is detected. If the VIR signal is not detected, the manually adjustable control signal derived from manual control 31 is transmitted through transistor 27e to the output of switching circuit 27.

Switching circuit 26 operates in a similar manner to selectively transmit either the sampled control signal produced by sample circuit 29 or the manually adjustable control signal produced by manual control 30 to its output. The output of switching circuit 27 is coupled to phase shifter 24 for the purpose of controlling the phase of the local oscillating signal applied to the phase shifter by oscillator 23 in accordance with the control signal which is selectively transmitted by switching circuit 27. Similarly, the outputs of switching circuit 26 is coupled to level control circuit 17 for the purpose of controlling the level of the chrominance component applied to demodulator 18 either with the sampled control signal produced by sample circuit 19 or with the manually adjustable control signal provided by manual control 30.

Figure 6:
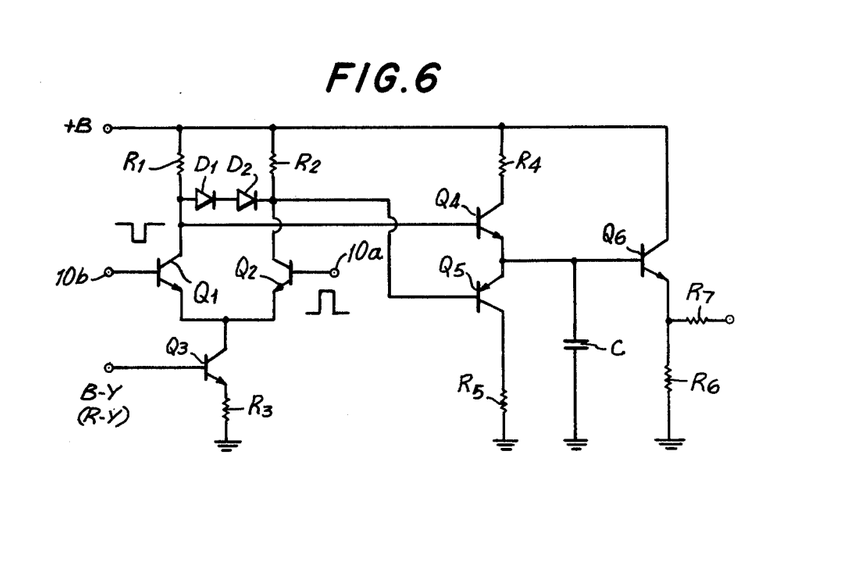
FIG. 6 is a schematic diagram of another embodiment of a sampling circuit which can be used in the apparatus of FIG. 2.

Referring now to FIG. 6, another embodiment of a sample circuit which can be used as, for example, sample circuits 28 or 29, is schematically illustrated. This sample circuit is comprised of a signal sampling portion formed of differentially-connected transistors $Q_1$ and $Q_2$ whose common-connected emitters are coupled to a current source transistor $Q_3$. The base electrodes of transistors $Q_1$ and $Q_2$ are coupled to VIR gate signal generator 10 for receiving oppositely-phased VIR gate signals, as are illustratively applied to base electrode input terminals 10a and 10b, respectively. The base electrode of transistor $Q_3$ is coupled to demodulator 18 and is adapted to receive the demodulated (B-Y) component, such as applied to sample circuit 29, or the demodulated (R-Y) component, as applied to sample circuit 28. The collector electrodes of transistors $Q_1$ and $Q_2$ are coupled to a source of operating potential +B via collector load resistors $R_1$ and $R_2$, respectively. In addition, these collector electrodes are interconnected by unidirectional current conducting devices, such as diodes $D_1$ and $D_2$.

The sample circuit schematically depicted in FIG. 6 is a sample-and-hold circuit including a holding, or storage, portion including a storage capacitor C. A pair of complementary transistors $Q_4$ and $Q_5$ have their emitter electrodes connected in common to supply capacitor C with a sampled voltage to be stored. The collector electrode of transistor $Q_4$ is coupled to the source of operating potential +B by a collector load resistor $R_4$, and the collector electrode of transistor $Q_5$ is coupled to ground by a collector load resistor $R_5$. As will be described, the stored potential across capacitor C is increased by transistor $Q_4$ and is decreased by transistor $Q_5$. In this regard, transistor $Q_4$ may be considered a charging transistor and transistor $Q_5$ may be considered a discharge transistor. Capacitor C is coupled through an emitter-follower $Q_6$ to an output terminal, such as for connection to switching circuits 26 or 27.

In operation, because of the oppositely-phased VIR gate signals applied to transistors $Q_1$ and $Q_2$, transistor $Q_2$ is rendered conductive during the interval that the chrominance reference component 2 (FIG. 1) of the VIR signal is expected while transistor $Q_1$ is non-conductive during this interval; and transistor $Q_2$ is rendered non-conductive (while transistor $Q_1$ is conductive) at all other times. When transistor $Q_2$ is non-conductive, its collector potential is relatively high so as to reverse bias the base-emitter junction of transistor $Q_5$. Hence, transistor $Q_5$ is not conductive. Similarly, when transistor $Q_1$ is conductive, its collector potential is lowered to reverse bias the base-emitter junction of transistor $Q_4$. Hence, transistor $Q_4$ also is non-conductive. Consequently, the voltage to which capacitor C had been charged, is not changed through transistors $Q_4$ and $Q_5$, and is applied through emitter-follower $Q_6$ to the output terminal.

Now, during the gating interval, that is when transistor $Q_2$ is conductive and transistor $Q_1$ is non-conductive, the current through the collector-emitter circuit of transistor $Q_2$ flows from +B, through collector load resistor $R_2$, through transistor $Q_2$ and through transistor $Q_3$ and resistor $R_3$ to ground. The current through transistor $Q_3$ is determined by the color-difference component applied to this transistor by demodulator 18. Thus, the current through transistor $Q_2$ represents this color-difference component, and the voltage at the collector electrode of transistor $Q_2$ is inversely related to the voltage applied to the base electrode of transistor $Q_3$.

Another portion of the current flowing through transistor $Q_2$ during this gating interval follows the current path from +B through collector load resistor $R_1$ and diodes $D_1$, $D_2$ to transistor $Q_2$. The collector voltage at transistor $Q_1$ thus differs from the collector voltage at transistor $Q_2$ by the voltage potential across diodes $D_1$ and $D_2$.

If the voltage applied to transistor $Q_3$ increases, the collector voltage of transistor $Q_2$ may become less than the voltage stored across capacitor C, therby forward-biasing transistor $Q_5$ so that capacitor C is charged (or discharged) by transistor $Q_5$. Conversely, if the voltage applied to transistor $Q_3$ is decreasing, the collector voltage of transistor $Q_2$, and also the collector voltage of transistor $Q_1$, increases. If these collector voltages are greater than the voltage across capacitor C, then the base-emitter junction of transistor $Q_5$ is reverse-biased and the base-emitter junction of transistor $Q_4$ is forward-biased. Thus, capacitor C is charged by transistor $Q_4$. In some instances, transistors $Q_4$ and $Q_5$ both may be forward-biased and rendered conductive concurrently.

If collector load resistors $R_1$ and $R_2$ are of equal resistance value R, and if the capacitance value of capacitor C is C, then the charge and discharge time constants of capacitor C are equal to $T = RC/2h_{fe}$, where $h_{fe}$ is a current amplification factor of transistors $Q_4$ and $Q_5$. If $h_{fe}$ is relatively large, the charge and discharge time constants are small. Hence, the sampling speed, that is, the speed at which the voltage across capacitor C can be charged, is high. One advantage of using complementary transistors $Q_4$ and $Q_5$ to charge or discharge capacitor C is that the effective resistance presented by each of these transistors can be expressed as $R/2h_{fe}$. By selecting transistors with a high $h_{fe}$, this equivalent resistance is very small. Hence, even if the capacitance C of capacitor C is large, the charge and discharge time constants nevertheless can be kept at a desirably low value. It is advantageous to use a storage capacitor having a high capacitance so that the voltage stored thereacross can be stably maintained at a substantially constant value. As another advantage, since the capacitance of capacitor C can be very high, its impedance is low so that the input impedance of the output circuit coupled thereto need not be very high. This means that a simple emitter-follower, such as emitter-follower $Q_6$, has a satisfactory input impedance to be used with the high capacitance of capacitor C. That is, if complementary transistors $Q_4$ and $Q_5$ are not used, then, in order to achieve a low charge and discharge time constant, the capacitance of capacitor C would have to be relatively small. Consequently, the impedance of such a low capacitance would be high, thereby requiring an output circuit having a relatively high input impedance. This would mean that a simple emitter-follower is not sufficient; and a Darlington-connected emitter-follower or field effect transistor would have to be used as the output circuit.

As a still further advantage derived from the use of complementary transistors, transistors $Q_4$ and $Q_5$ readily can be selected to have equal $h_{fe}$. Hence, the charge and discharge time constants for capacitor C are equal, resulting in symmetrical charging and discharging characteristics.

Figure 7:
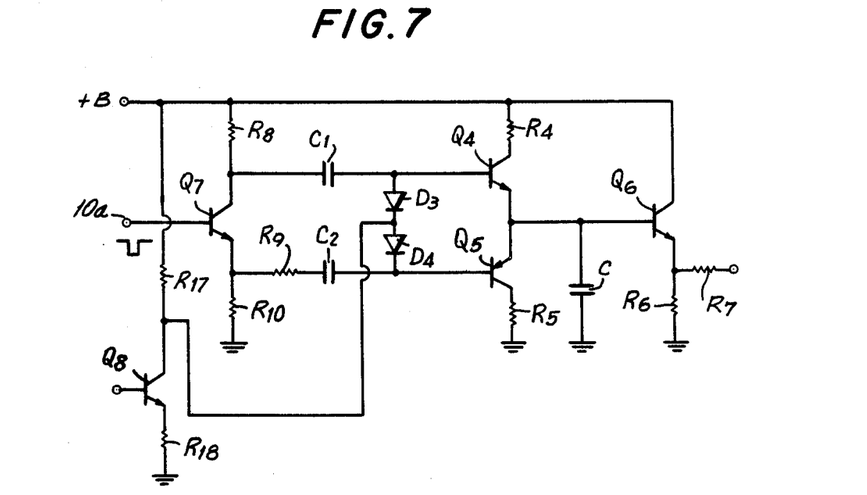
FIG. 7 is a schematic diagram of yet another embodiment of a sampling circuit.

An alternative embodiment of a sample circuit which can be used as sample circuits 28 and 29 is schematically illustrated in FIG. 7. In this alternative embodiment, the holding circuit is the same as that described above with respect to FIG. 6. That is, a storage capacitor C is charged and discharged through complementary transistors $Q_4$ and $Q_5$. Hence, by using this holding circuit, the advantages mentioned above are equally applicable to the FIG. 7 embodiment.

The sample circuit illustrated in FIG. 7 is comprised of a transistor $Q_7$ whose base electrode is coupled to VIR gate signal generator 10 for receiving a VIR gate signal, as illustrated, and whose collector-emitter circuit is connected across a steering circuit comprised of capacitor $C_1$, diodes $D_3$ and $D_4$, capacitor $C_2$ and resistor $R_9$, all connected in series. In addition, a collector resistor $R_8$ connects the collector electrode of transistor $Q_7$ to a source of operating potential +B, and an emitter resistor $R_{10}$ connects the emitter electrode of this transistor to ground. A transistor $Q_8$ is supplied with a color-difference component produced by demodulator 18, such as the (B-Y) component in the event that the illustrated sample circuit is used as sample circuit 29, or the (R-Y) component in the event that this sample circuit is used as sample circuit 28. Transistor $Q_8$ is provided with collector and emitter load resistors $R_{17}$ and $R_{18}$, respectively, and its collector electrode is connected to the junction defined by diodes $D_3$ and $D_4$.

In operation, transistor $Q_7$ is conductive except during the VIR gating interval during which the illustrated VIR gate signal is applied thereto. When transistor $Q_7$ is conductive, its collector and emitter electrodes are provided with almost the same potential. Thus, diodes $D_3$ and $D_4$ are not sufficiently forward-biased, and remain non-conductive. However, during the VIR gating interval, the VIR gate signal applied to transistor $Q_7$ renders this transistor non-conductive. Hence, its collector electrode is provided with a relatively high potential and its emitter electrode is provided substantially with ground level potential. Since the voltage across a capacitor cannot change instantaneously, the high potential at the collector electrode of transistor $Q_7$ is provided at both plates of capacitor $C_1$, and the low potential at the emitter electrode of transistor $Q_7$ is provided at both plates of capacitor $C_2$. Hence, diodes $D_3$ and $D_4$ are forward-biased, and both diodes are conductive.

The color-difference component applied to transistor $Q_8$ is amplified by this transistor such that its collector voltage is inversely related to the applied color-difference component. This collector voltage is applied through conducting diodes $D_3$ and $D_4$ to the base electrodes of complementary transistors $Q_4$ and $Q_5$, respectively. As was described with respect to FIG. 6, if the voltage applied through diode $D_3$ to transistor $Q_4$ increases, then capacitor C is charged through this transistor. If the voltage applied through diode $D_4$ to transistor $Q_5$ decreases, then capacitor C is discharged by this transistor. Thus, when diodes $D_3$ and $D_4$ are rendered conductive in response to the VIR gating signal applied to transistor $Q_7$, the particular color-difference component applied to transistor $Q_8$ by demodulator 18 is transmitted to transistors $Q_4$ and $Q_5$ to correspondingly change the voltage stored across capacitor C. That is, the selective conductivity of diodes $D_3$ and $D_4$ serves to sample the color-difference component produced by demodulator 18.

Figure 8:
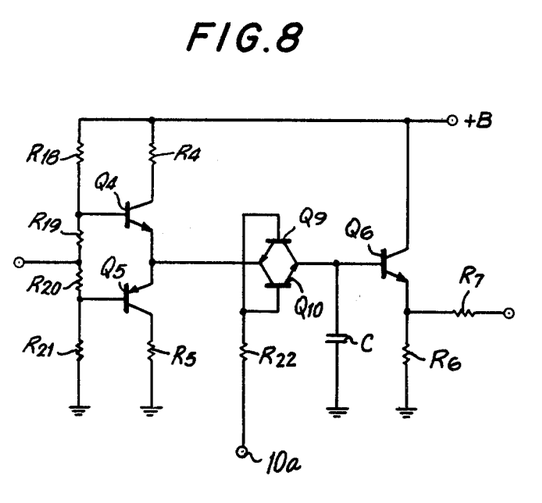
FIG. 8 is a schematic diagram of a further embodiment of a sampling circuit.

In another embodiment of a sample circuit which can be used as sample circuits 28 and 29 is schematically illustrated in FIG. 8. The holding circuit shown in FIG. 8 is similar to that described hereinabove with respect to FIGS. 6 and 7 and includes complementary transistors $Q_4$ and $Q_5$ which are coupled to storage capacitor C to selectively charge and discharge this capacitor. Consequently, the advantages mentioned hereinabove with respect to this type of holding circuit are equally applicable to the embodiment of FIG. 8. In this alternative embodiment, the color-difference component (B-Y) or (R-Y) is applied from demodulator 18 to the base electrodes of transistors $Q_4$ and $Q_5$. A resistive voltage divider network formed of series-connected resistors $R_{18}$, $R_{19}$, $R_{20}$ and $R_{21}$ provide suitable bias potentials to transistors $Q_4$ and $Q_5$, and the color-difference component is applied to the junction defined by resistors $R_{19}$ and $R_{20}$. A pair of symmetrical switching transistors $Q_9$ and $Q_{10}$ have their collector-emitter circuits connected in parallel paths between the common-connected emitter electrodes of transistors $Q_4$ and $Q_5$ and capacitor C. The base electrodes of these symmetrical transistors are connected in common through a resistor $R_{22}$ to receive the VIR gating signal produced by VIR gate signal generator 10. If transistors $Q_9$ and $Q_{10}$ are npn transistors, such as illustrated, then the VIR gating signal is represented as a positive pulse. Conversely, if transistors $Q_9$ and $Q_{10}$ are pnp transistors, then the VIR gating signal is represented as a negative pulse.

It is believed that the operation of the embodiment shown in FIG. 8 is fully recognized and, in the interest of brevity, further description thereof is not provided. As a further modification of this embodiment, a single symmetrical transistor can be used in place of the pair of transistors $Q_9$ and $Q_{10}$. Also, transistors $Q_9$ and $Q_{10}$ can be replaced by other conventional semiconductor switching devices which will provide a charge and discharge path between the common-connected emitter electrodes of transistors $Q_4$ and $Q_5$ and storage capacitor C.

Figure 9:
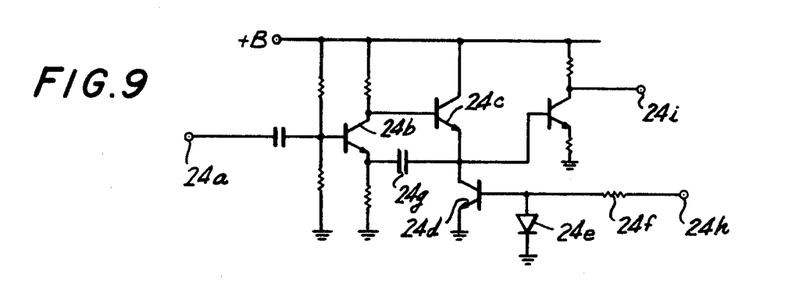
FIG. 9 is a schematic diagram of one embodiment of a phase shifter which can be used in the apparatus of FIG. 2.

One embodiment of phase shifter 24 (FIG. 2) is schematically illustrated in FIG. 9. This phase shifter includes a transistor 24b whose base electrode is coupled to an input terminal 24a adapted to be supplied with an oscillating signal produced by oscillator 23. Transistor 24b functions as a phase-splitter such that the signals produced at its collector and emitter electrodes exhibit opposite phases with respect to each other. The collector electrode of this transistor is coupled to the emitter electrode through the base-emitter circuit of a transistor 24c and through a capacitor 24g. The collector electrode of transistor 24c is coupled to a source of operating potential +B, and the junction defined by its emitter electrode and capacitor 24g is coupled to a current source formed of transistor 24d. The base-emitter junction of transistor 24d is connected in parallel with a diode 24e, and the base electrode of this transistor additionally is coupled through a resistor 24f to an input terminal 24h which is adapted to receive the control voltage selectively applied thereto by switching circuit 27.

The junction defined by the emitter electrode of transistor 24c and capacitor 24g additionally is connected to an output terminal 24i through an output transistor.

In operation, the collector-emitter current of transistor 24d is determined by the control signal applied to control terminal 24h by switching circuit 27. Let it be assumed that this current is represented as I. Neglecting the base-emitter current through the output transistor in the embodiment shown in FIG. 9, the emitter current of transistor 24c also is substantially equal to I. Let the emitter resistance of transistor 24c be represented as r. Then, the effective emitter resistance of transistor 24c is determined as $r = kT/qI$, where $k$ is the Boltzmann constant, T is temperature and q is the electron charge.

Figure 10:
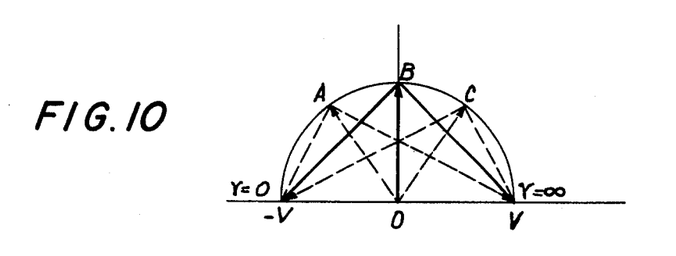
FIG. 10 is a vector diagram which is useful in explaining the operation of FIG. 9.
Figure 11:
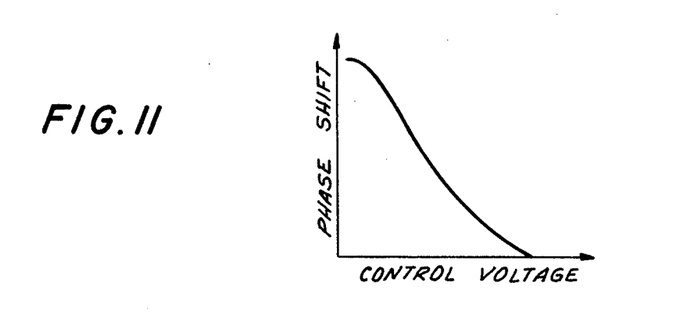
FIG. 11 is a graphic representation of the operation of FIG. 9.

From this equation, it is seen that the effective resistance coupled between the collector electrode of transistor 24b and capacitor 24g is a function of the current I through transistor 24d which, in turn, is determined by the control signal applied to control terminal 24h. Therefore, the oscillating signal applied to terminal 24a is phase-split by transistor 24b, resulting in a signal across the collector-emitter circuit of transistor 24b which is applied to a variable resistor whose resistance is the effective emitter resistance of transistor 24c, connected in series with capacitor 24g. Depending upon the emitter resistance of transistor 24c, the phase-shifted signal obtained at the junction between the emitter electrode of transistor 24c and capacitor 24g is subjected to a corresponding phase shift. This phase-shift is shown in the vector diagram of FIG. 10. If the control signal applied to control terminal 24h is sufficiently high such that the current I is high, the effective emitter resistance of transistor 24c is relatively low. Conversely, if the control signal applied to control terminal 24h is of a low value such that current I is relatively low, then the effective emitter resistance of transistor 24c is very high. As shown in FIG. 10, the output phase-shifted signal produced at output terminal 24i is represented as the vectors OA, OB, or OC, depending upon the level of the control signal which, in turn, determines the effective emitter resistance of transistor 24c. This relationship between the applied control voltage and the resultant phase shift imparted to the oscillating signal by the phase shifter illustrated in FIG. 9 is graphically depicted in FIG. 11.

Figure 12:
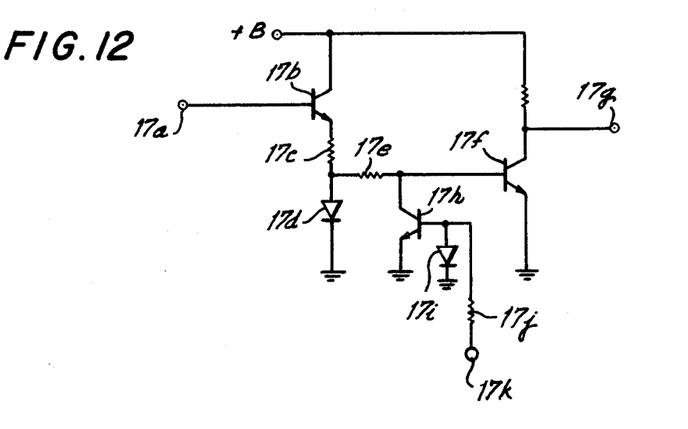
FIG. 12 is a schematic diagram of one embodiment of a level control circuit which can be used in the apparatus of FIG. 2.

An embodiment of a level control circuit which can be used as level control circuit 17 (FIG. 2) is schematically illustrated in FIG. 12. This level control circuit is comprised of a transistor 17b, connected in emitter-follower configuration and including an emitter load resistor 17c connected in series with a diode 17d to ground. The base electrode of transistor 17b is coupled to an input terminal 17a to receive the chrominance component amplified by band pass amplifier 16 (FIG. 2). The output of transistor 17b is derived from the junction between resistor 17c and diode 17d and is coupled through a resistor 17e to an amplifying transistor 17f whose collector electrode is connected to an output terminal 17g. This output terminal is, for example, coupled to demodulator 18. The base electrode of transistor 17f also is coupled through the collector-emitter circuit of a transistor 17h to ground. A diode 17i is connected in parallel with the base-emitter junction of transistor 17h, and the base electrode of this transistor is coupled through a resistor 17j to a control terminal 17k for receiving a control voltage selectively applied thereto by switching circuit 26.

Figure 13:
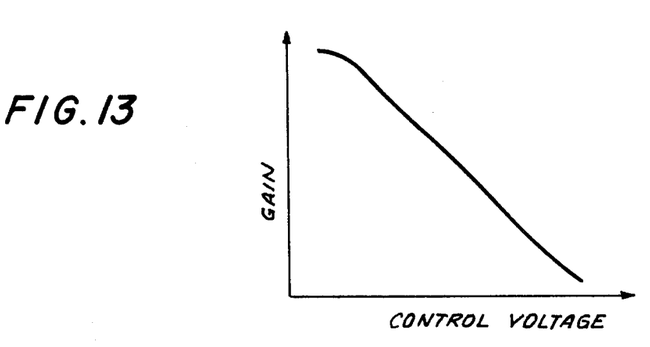
FIG. 13 is a graphic representation of the operation of FIG. 12.

As the control signal applied to transistor 17h increases, the collector-emitter resistance of this transistor decreases, such that the voltage divider formed of resistor 17e and the collector-emitter resistance of transistor 17h serves to increase the attenuation of the base signal applied to transistor 17f. Thus, as the saturation control signal applied to control terminal 17k increases in magnitude, the effective gain of the illustrated level control circuit decreases. Conversely, as the level of the control signal decreases, the effective gain of the level control circuit increases. This relationship between the control signal and overall gain of the circuit illustrated in FIG. 12 is graphically depicted in FIG. 13.

While the present invention has been particularly shown and described with respect to certain preferred embodiments, it should be readily appreciated that various modifications and changes in form and details can be made by one of ordinary skill in the art without departing from the spirit and scope of this invention. Therefore, it is intended that the appended claims be interpreted as including all such modifications and changes.

What is claimed is:

1. Color television receiving apparatus for receiving a composite color television signal including horizontal synchronizing signals, color burst signals and luminance and chrominance components, the composite color television signal being of the type which additionally may include a VIR signal provided in a predetermined line interval during the vertical retrace interval, said apparatus comprising signal processing means for processing said received composite color television signal to produce a video picture therefrom; signal generating means for generating sampling signals during the predetermined line intervals in which said VIR signal is provided; detecting means coupled to said signal processing means and responsive to said sampling signals to detect if said VIR signal is included in said received composite color television signal; sampling means responsive to said sampling signals for sampling at least one component produced by said signal processing means to produce sampled control signals; manually operable means for producing manually adjustable control signals; switch means coupled to said sampling means and to said manually operable means and having output means, said switch means being controlled by said detecting means to selectively supply said sampled control signals to its output means if the VIR signal is detected and to supply said manually adjustable control signals to its output means if the VIR signal is not detected; and control means responsive to the control signals selectively supplied to said output means of said switch means for controlling said signal processing means, thereby controlling predetermined characteristics of said video picture.

2. Color television receiving apparatus for receiving a composite color television signal including horizontal synchronizing signals, color burst signals and luminance and chrominance components, the composite color television signal being of the type which additionally may include a VIR signal provided in a predetermined line interval during the vertical retrace interval, said VIR signal including a luminance reference level; said apparatus comprising signal processing means for processing said received composite color television signal to produce a video picture therefrom including means for separating the luminance and chrominance components from said received composite color television signal, and luminance amplifying means for amplifying said separated luminance component; signal generating means for generating sampling signals during the predetermined line intervals in which said VIR signal is provided; detecting means coupled to said signal processing means and responsive to said sampling signals to detect if said VIR signal is included in said received composite color television signal; sampling means responsive to said sampling signals for sampling at least the luminance component produced by said signal processing means to produce a sampled luminance reference level; manually operable means for producing manually adjustable control signals; switch means coupled to said sampling means and to said manually operable means and having output means, said switch means being controlled by said detecting means to selectively supply said sampled luminance reference level to its output means if the VIR signal is detected and to supply said manually adjustable control signals to its output means if the VIR signal is not detected; and control means including luminance gain control means responsive to the luminance reference level and control signals selectively supplied to said output means of said switch means for selectively controlling the gain of said luminance amplifying means.

3. The apparatus of claim 2 wherein said signal generating means generates a luminance reference sampling signal; and said sampling means includes a sample-and-hold circuit having an input coupled to receive the output of said luminance amplifying means and responsive to said luminance reference sampling signal for sampling said luminance amplifying means output during the time that the luminance reference level of said VIR signal is provided and for storing said sampled luminance amplifying means output.

4. The apparatus of claim 3 wherein said VIR signal further includes a black reference level and said signal generating means generates a black reference sampling signal; and wherein said sampling means further includes another sample-and-hold circuit having an input coupled to receive said output of said luminance amplifying means and responsive to said black reference sampling signal for sampling said luminance amplifying means output during the time that the black reference level of said VIR signal is provided and for storing said sampled luminance amplifying means output, said luminance gain control means selectively controlling the gain of said luminance amplifying means with the sampled outputs stored by said first-mentioned and said other sample-and-hold circuits.

5. The apparatus of claim 4 wherein said manually operable means comprises first and second variable signal generators; and said switch means comprises a first switching circuit coupled to said first-mentioned sample-and-hold circuit and to said first variable signal generator, and a second switching circuit coupled to said other sample-and-hold circuit and to said second variable signal generator, said first and second switching circuits being controlled by said detecting means to selectively supply said luminance gain control means with said respective sampled outputs or with the outputs of said variable signal generators.

6. The apparatus of claim 1 wherein said VIR signal includes a chrominance reference component; and said signal processing means includes means for separating the luminance and chrominance components from said received composite color television signal, and demodulating means for demodulating said chrominance component into color signal components; at least one of said color signal components being sampled by said sampling means.

7. The apparatus of claim 6 wherein said chrominance reference component is a subcarrier signal whose phase is in predetermined alignment with the axis of a particular one of said color signal components and whose amplitude is of a predetermined level; and wherein said signal processing means further includes means for supplying said demodulating means with a local oscillating signal substantially equal in frequency to said subcarrier signal such that said VIR signal is demodulated into color signal components of particular levels by said demodulating means; and said control means comprises phase control means for controlling the phase of said local oscillating signal in accordance with control signals supplied by said switch means.

8. The apparatus of claim 7 wherein said sampling means comprises a sample-and-hold circuit for sampling and storing said one color signal component produced by said demodulating means in response to said VIR signal and for comparing the level of said sampled color signal component to a predetermined level so as to produce a sampled control signal proportional to the difference between the level of said sampled color signal component and the predetermined level.

9. The apparatus of claim 8 wherein said control means further comprises level control means for controlling the level of said chrominance component in accordance with control signals supplied by said switch means; and said sampling means further comprises another sample-and-hold circuit for sampling and storing another color signal component produced by said demodulating means in response to said VIR signal and for comparing the level of said other sampled color signal component to a predetermined level so as to produce another sampled control signal proportional to the difference between the level of said other sampled color signal component and the predetermined level.

10. The apparatus of claim 9 wherein said manually operable means comprises a manually adjustable hue signal generator for generating a hue control signal and a manually adjustable saturation signal generator for generating a saturation control signal; and said switch means comprises a first switching circuit coupled to said first-mentioned sample-and-hold circuit and to said hue signal generator and a second switching circuit coupled to said other sample-and-hold circuit and to said saturation signal generator, said first and second switching circuits being controlled by said detecting means to selectively supply said phase control means and said level control means with said respective sampled control signals or with said respective hue and saturation control signals.

11. The apparatus of claim 1 wherein said detecting means comprises means for receiving a particular component produced by said signal processing means; a circuit responsive to said sampling signals for sampling said particular component; comparator means for comparing the sampled particular component to a reference level; and output means coupled to said comparator means for producing a first output signal in response to the difference between said sampled particular component and said reference level when said VIR signal is present and a second output signal in response to the difference between said sampled particular component and said reference level when said VIR signal is not present.

12. The apparatus of claim 11 wherein said switch means comprises first transistor means connected to be energized by said first output signal to provide a control signal path to said control means for said sampled control signals, and second transistor means connected to be energized by said second output signal to provide a control signal path to said control means for said manually adjustable control signals.

13. The apparatus of claim 1 wherein said sampling means comprises a semiconductor switching device supplied with said one component produced by said signal processing means and energized by said sampling signals to selectively transmit said one component; and a storage circuit including an operational amplifier having inverting and non-inverting inputs and an output, one of said inputs being supplied with said selectively transmitted one component and the other of said inputs being supplied with a reference level, and a holding capacitor connected between said output and an input.

14. The apparatus of claim 1 wherein said sampling means comprises a holding capacitor; semiconductor switching means energized by said sampling signals to selectively enable said one component produced by said signal processing means to be stored by said holding capacitor; and complementary transistors supplied with said one component and having their respective emitter electrodes coupled in common to said holding capacitor so as to selectively supply said holding capacitor with said one component.

15. The apparatus of claim 14 wherein said semiconductor switching means comprises a pair of differentially-connected transistors whose base electrodes are supplied with oppositely phased sampling signals; means for applying said one component produced by said signal processing means to the respective input electrodes of said differentially-connected transistors; and means for coupling the output electrodes of said differentially-connected transistors to the base electrodes of respective ones of said complementary transistors.

16. The apparatus of claim 15 wherein said differentially-connected transistors have their emitter electrodes connected in common and their collector electrodes interconnected via unidirectional conducting means, said collector electrodes being coupled to said base electrodes of said respective complementary transistors; and wherein said means for applying said one component to said respective input electrodes of said differentially-connected transistors comprises a current-determining transistor whose base electrode is supplied with said one component and whose collector-emitter circuit is connected in series with the common-connected emitter electrodes of said differentially-connected transistor.

17. The apparatus of claim 14 wherein said semiconductor switching means comprises a pair of diodes; diode control means supplied with said sampling signals for rendering said diodes conductive in response thereto; means for applying said one component produced by said signal processing means to said pair of diodes; and means for coupling said diodes to the base electrodes of respective ones of said complementary transistors so that said one component is applied to said complementary transistor when said diodes are conductive.

18. The apparatus of claim 17 wherein said diodes are connected in series to define a junction therebetween; said diode control means comprises a transistor whose collector-emitter circuit is connected across the series-connected diodes and whose base electrode is supplied with said sampling signals; and said means for applying said one component to aid pair of diodes comprises a further transistor for applying said one component to said junction.

19. The apparatus of claim 14 wherein said semiconductor switching means comprises a pair of transistors supplied with said sampling signals and rendered conductive in response thereto, the collector-emitter circuits of both transistors in said pair defining parallel signal paths between the common-connected emitter electrodes of said complementary transistors and said holding capacitor.

20. Color television receiving apparatus for receiving a composite color television signal including horizontal synchronizing signals, color burst signals and luminance and chrominance components, the composite color television signal being of the type which additionally may include a VIR signal provided in a predetermined line interval during the vertical retrace interval, the VIR signal having a luminance reference component and a chrominance reference component, said apparatus comprising means for separating said luminance and chrominance components from said composite color television signal; luminance amplifying means for amplifying the separated luminance component; demodulating means for demodulating the separated chrominance component into color signal components; sampling signal generating means for generating luminance reference sampling signals and chrominance reference sampling signals during the predetermined line intervals in which said VIR signal is provided; detecting means responsive to the received composite color television signal for detecting whether said VIR signal is present; luminance sampling means coupled to said luminance amplifying means and responsive to said luminance reference sampling signals for sampling the amplified luminance component during said predetermined line intervals; manually adjustable luminance reference signal means for providing a luminance reference signal; luminance switch means coupled to said luminance sampling means and to said luminance reference signal means and responsive to said detecting means for selectively transmitting the sampled luminance component or the luminance reference signal; luminance control means coupled to said luminance switch means for controlling said luminance amplifying means with the signal selectively transmitted by said luminance switch means; chrominance sampling means coupled to said demodulating means and responsive to said chrominance reference sampling signals for sampling at least one of the color signal components produced by said demodulating means during said predetermined line intervals; manually adjustable color reference signal means for providing at least one color reference signal; chrominance switch means coupled to said chrominance sampling means and to said color reference signal means and responsive to said detecting means for selectively transmitting the at least one color signal component or the at least one color reference signal; and chrominance control means coupled to said chrominance switch means for controlling said demodulating means with the at least one signal selectively transmitted by said chrominance switch means.

21. The apparatus of claim 20 further comprising means for applying an oscillating signal to said demodulating means for demodulating said chrominance component, and level control means for controlling the level of the chrominance component applied to said demodulating means; and wherein said chrominance sampling means comprises first and second sampling circuits for sampling first and second color signal components, said manually adjustable color reference signals means comprises manually adjustable hue and saturation reference signal means for providing hue and saturation reference signals, respectively, said chrominance switch means comprises hue switch means coupled to said first sampling circuit and to said hue reference signal means and saturation switch means coupled to said second sampling circuit and to said saturation reference signal means, and said chrominance control means comprises hue control means coupled to said hue switch means for controlling the phase of said oscillating signal and saturation control means coupled to said saturation switch means for controlling said level control means.

* * * * *